United States Patent [19]
Bruce

[11] Patent Number: 5,873,232
[45] Date of Patent: Feb. 23, 1999

[54] PRELOADED JOINING LINK

[75] Inventor: Peter Bruce, Douglas, Isle of Man

[73] Assignee: Brupat Limited, Onchen, Isle of Man

[21] Appl. No.: 849,152

[22] PCT Filed: Nov. 28, 1994

[86] PCT No.: PCT/GB95/02773

§ 371 Date: Jul. 22, 1997

§ 102(e) Date: Jul. 22, 1997

[87] PCT Pub. No.: WO96/17186

PCT Pub. Date: Jun. 6, 1996

[30] Foreign Application Priority Data

Nov. 29, 1994 [GB] United Kingdom ............. 9424049

[51] Int. Cl.$^6$ ............................................. F16G 15/02
[52] U.S. Cl. ................................................. 59/85
[58] Field of Search ............................ 59/84, 85, 78

[56] References Cited

U.S. PATENT DOCUMENTS 2,537,405  1/1951  Gilbert .
3,139,720  7/1964  Robbins .

FOREIGN PATENT DOCUMENTS

| 12206/70 | 10/1971 | Australia . | |
|---|---|---|---|
| 0 034 599 | 3/1981 | European Pat. Off. . | |
| 1158242 | 6/1958 | France ....................................... | 59/85 |
| 1 269 428 | 5/1968 | Germany . | |
| 3916-284 A | 11/1990 | Germany ................................... | 59/85 |
| 8652 | 5/1889 | United Kingdom ...................... | 59/85 |
| 2388 | 2/1909 | United Kingdom ...................... | 59/85 |
| 259727 | 10/1926 | United Kingdom ...................... | 59/85 |

*Primary Examiner*—David Jones
*Attorney, Agent, or Firm*—Thelen, Reid & Priest LLP

[57] ABSTRACT

A chain joining link (1) having an assemblage of disassemblable parts enabling the link (1) to be fitted on two adjacent chain sections, the assemblage having U-shaped end members (2) to retain said chain sections, the U-shaped members (2) including recesses (7) receiving flanges (4) whereby the members (2) are joined for assembly of the link. Each recess (7) has a width greater than that of the corresponding flange (4), and the width difference (gap) is accommodated by a wedge (8). The wedge (8) is fitted into the gap so as to preload the link by a predetermined amount and to this end the wedge (8) is first placed in the gap to a first position with no force fitting, and thereafter the wedge (8) is forced a predetermined distance from said first position to a second position so causing a compressive preload in the flange (4) and a tensile preload in the material surrounding the recess (7). Assembly is completed by the fitting of a columnar stud (15). A special tool is provided for the movement of the wedge (8) to the second position. Also a hole (13) is provided to facilitate release of the wedge (8) to the first position for link disassembly. The arrangement enables the required preload without the need for costly precision in the formation of the flange and recess.

15 Claims, 4 Drawing Sheets

PRELOADED JOINING LINK

The present invention is concerned with improvements in flanged joint joining links for chain which include means for preloading the flanged joint to prolong the fatigue life of the joining links.

Preloaded flanged joint joining links are known from the applicant's European Patent Specification No. 0034599 which discloses a link-shaped assemblage of members including two opposed U-shaped parts with end flanges and two opposed coupling shells with pockets for receiving pairs of end flanges. Inclined surfaces on the flanges are held in abutment when the flanges are placed partially aligned in the pockets of the coupling shells. When the coupling shells are drawn together by means of screws, the flanges are forced to slide into alignment along their inclined surfaces and along load transfer surfaces between flanges and coupling shells so that the widths of the flange pairs increase and stretch the pockets thereby establishing compressive preloading in the flanges and tensile preloading in the coupling shells.

This preloaded joining link has three disadvantages. First, high costs are incurred for the very precise fine-tolerance milling required to minimise the combined tolerance errors in flanges and pockets which can result in unacceptable uncertainty in the width excess between aligned flange pairs and pockets of the same order as that necessary to stretch the pockets and produce the desired preload. Second, relative movement as the preloading becomes high between flanges and coupling shells during sliding alignment of the flanges to stretch the coupling shell pockets tends to cause galling damage (pick up of material from one surface by the other due to adhesion when sliding under heavy loads) to the relatively small area load transfer surfaces between flanges and coupling shells. Third, a lack of interchangability of component parts between links arises from the necessity, despite the precise milling, to finalise the width of each abutting flange pair by grinding the inclined surface on each flange following accurate measurement of the widths actually achieved in the corresponding pair of pockets in order to minimise variance in preload stress between abutting coupling shells. The first mentioned disadvantage has prevented wide-spread adoption of the preloaded link even through it provides a needed technical solution for premature failure due to fatigue of chain joining links in the offshore industry.

It is an object of the present invention to provide an improved preloaded joining link which obviates the above disadvantages.

According to the present invention a chain joining link comprises a link-shaped assemblage providing opposed U-shaped portions for retaining adjoining chain sections, the assemblage including a plurality of assemblable parts to enable the joining link to be fitted to the adjacent chain sections, at least one of the parts being provided with flange means while another of the parts is provided with recess means to receive the flange means during assembly of the link, the width of the recess means being greater than the corresponding width of the flange means, and wedge means including a wedge for insertion into the recess means following insertion of the flange means to take up the difference between the widths at a first insertion position of the wedge from which forced further insertion of the wedge through a predetermined distance to a second insertion position stretches the recess means without relative movement occurring between flange means and recess means to establish a correspondingly predetermined compressive preload in the flange means and a correspondingly predetermined tensile preload in the material surrounding the recess means.

Preferably the wedge includes a portion which protrudes from the recess when the wedge is located in the second insertion position. Preferably the protruding portion has an inclined surface arranged to co-operate with a wedge-shaped tool slidable transversely through the link between stops on the tool to move the wedge forcibly through a predetermined distance from the first insertion position to the second insertion position.

Preferably, an access hole is provided in the recess means whereby drift means may be applied to the wedge within the recess to move it forcibly back from the second insertion position to the first insertion position to facilitate disassembly of the link.

Preferably locking means are provided to lock the wedge in the second insertion position.

Preferably the chain joining link is provided with a stud constituting a columnar support for transversely bracing a central region of the link said stud including two separate half-portions disposed one at each side of the longitudinal axis of the link.

Preferably said stud half-portions are fastened and drawable together by screw means.

Preferably each stud half-portion has inclined surfaces which mate expansively against correspondingly inclined opposed inner surfaces on the engaged U-shaped portions of the link when the stud half-portions are drawn together by said screw means.

Preferably the stud includes recesses which accommodate the protruding portions of the wedges.

Preferably deformable material is located in the stud recesses to grip the protruding portions of the wedges and lock the wedges in the second insertion position without inhibiting the expansive mating of the inclined surfaces of the stud with the corresponding inclined surfaces of the link.

Preferably a transverse surface parallel to the longitudinal axis of the link is located on each U-shaped portion between said opposed inclined inner surfaces to serve as a reaction surface for said wedge-shaped tool.

Preferably the wedge means includes a plurality of wedges providing two variably spaced parallel surfaces which stretch the recess means by bearing on the flange means and on the recess means.

Embodiments of the present invention will now be described, by way of example, with reference to the accompanying drawings in which.

Figure 1:
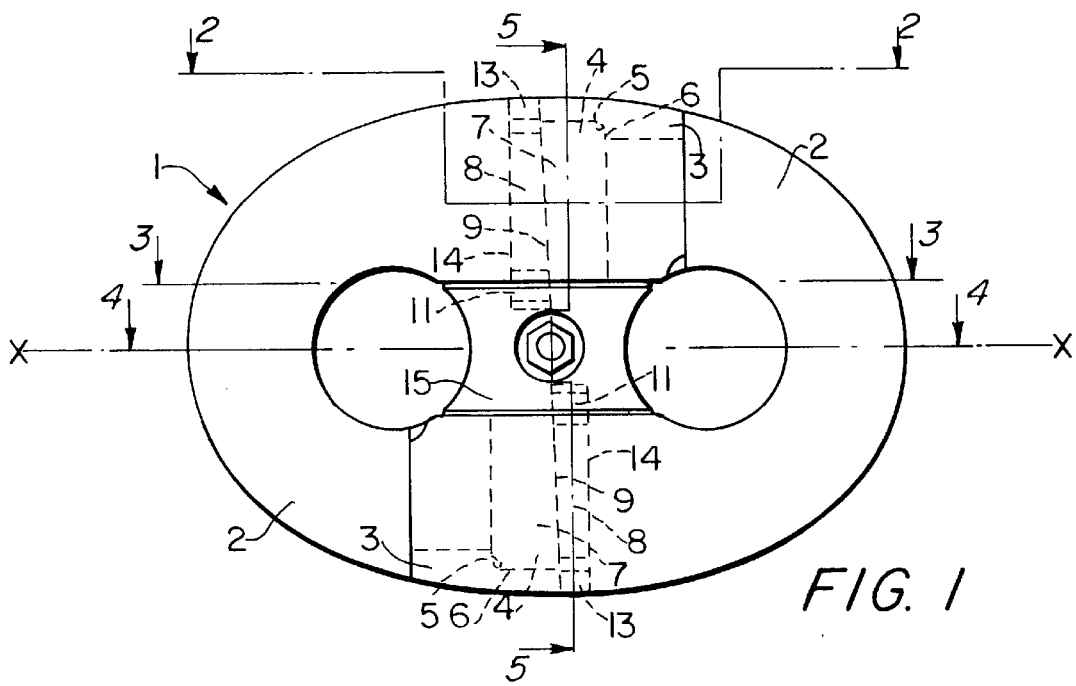
FIG. 1 shows a side view of a joining link for a link chain, according to the present invention.
Figure 2:
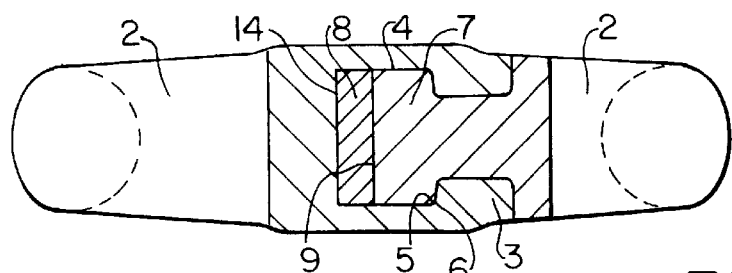
FIG. 2 shows a plan view, with a section 2—2, of the joining link of FIG. 1.
Figure 3:
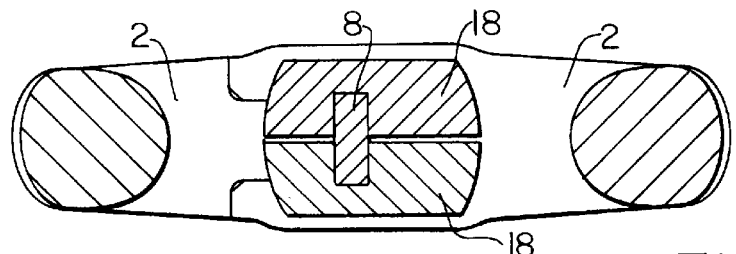
FIG. 3 shows a plan view, with a section 3—3, of the joining link of FIG. 1.
Figure 4:
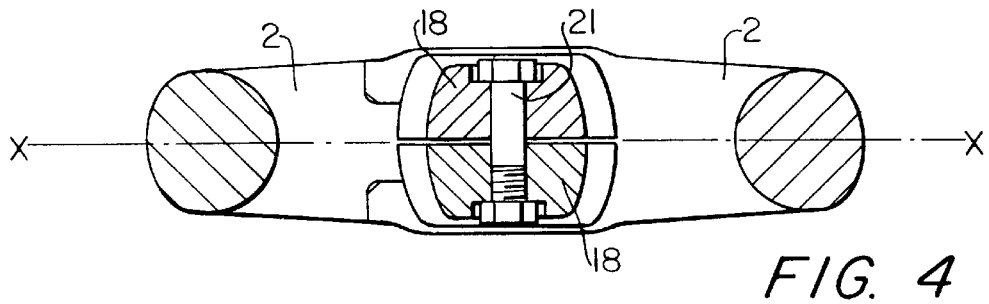
FIG. 4 shows a plan view, with a section 4—4, of the joining link FIG. 1.
Figure 5:
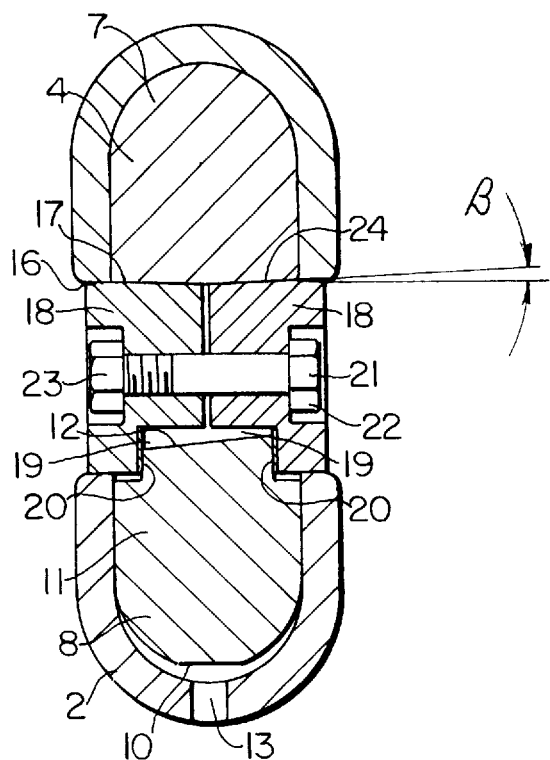
FIG. 5 shows an end view, with a section 5—5, of the joining link FIG. 1.
Figure 12:
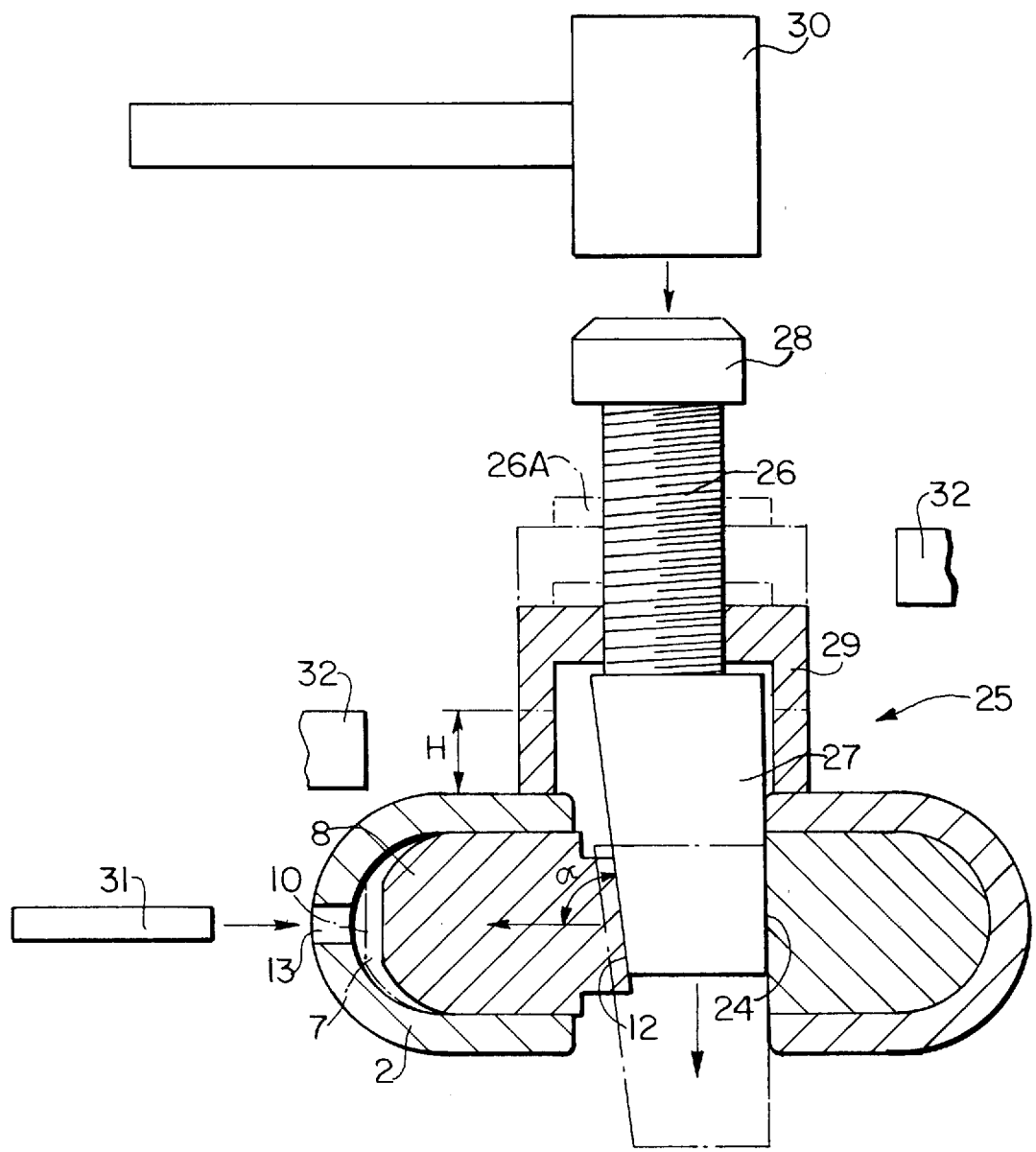
FIG. 12 shows section 5—5 of FIG. 5 fitted with a tool for forcing each wedge from the first insertion position shown in FIG. 9 into the second insertion position shown in FIG. 10.

Referring now to FIGS. 1 to 7, a joining link 1 for chain sections comprises a pair of identical U-shaped members 2 arranged in facing opposed engaged relationship. One facing end of each U-shaped member 2 carries an internal flange 3 and the other end carries an external flange 4. Flange 3 and flange 4 are provided with planar load transfer surfaces 5 and 6 respectively which lie orthogonal to the long axis X—X (FIGS. 1 and 4) of the joining link. A recess 7 is provided adjacent the internal flange 3 on one U-shaped member 2 to receive the external flange 4 of the other U-shaped member 2 to permit the load transfer surfaces 5 and 6 to mate when the U-shaped members are engaged together. As shown in FIG. 5, the cross-sections of flange 4 and recess 7 are both D-shaped. The width of recess 7, measured parallel to axis X—X, is substantially greater than the corresponding width of flange 4 to accommodate a generally D-shaped wedge 8 curved at the thin end of the wedge and with a precision-ground wedge angle $\alpha$ of up to 6, but with 2 preferred. The external face 9 of flange 4 is also inclined at the precision-ground angle a with respect to the load transfer surface 6. Wedge 8 is provided with a flat land 10 at the thin end and a protruding tang 11 carrying an inclined surface 12 at the thick end of the wedge. When wedge 8 is inserted into recess 7, surface 12 is inclined at an angle $\delta$ in the range 80° to 86° from the insertion direction (FIG. 12). A hole 13 is provided in each U-shaped member 2 which allows access to flat land 10 at the thin end of wedge 8 when it is located in recess 7 in abutment with a rear face 14 of recess 7. A columnar supporting stud 15 is provided to brace the ends of the engaged U-shaped members 2 when located in position at the centre of the assembled joining link. Stud 15 has upper and lower supporting surfaces 16 transversely inclined at an angle $\beta$ (FIG. 5) to the plane of section 3—3 (FIGS. 1 and 3) which engage between corresponding inclined surfaces 17 located on the insides of the ends of the mated U-shaped members 2. The magnitude of angle $\beta$ in the range 1° to 5° with ° preferred. Stud 15 is formed by two identical halves 18 (FIG. 5) which carry recesses 19 containing deformable material 20 to engage on the tangs 11 of wedges 8. Each stud half 18 has a central transverse countersunk bore hole 21 to accommodate a bolt 22 and fastening nut 23 for fastening the stud halves together. Opposed parallel surfaces 24 are located on the mated U-shaped members 2 between surfaces 17 to provide reaction surfaces for a wedge insertion tool.

Figure 5A:
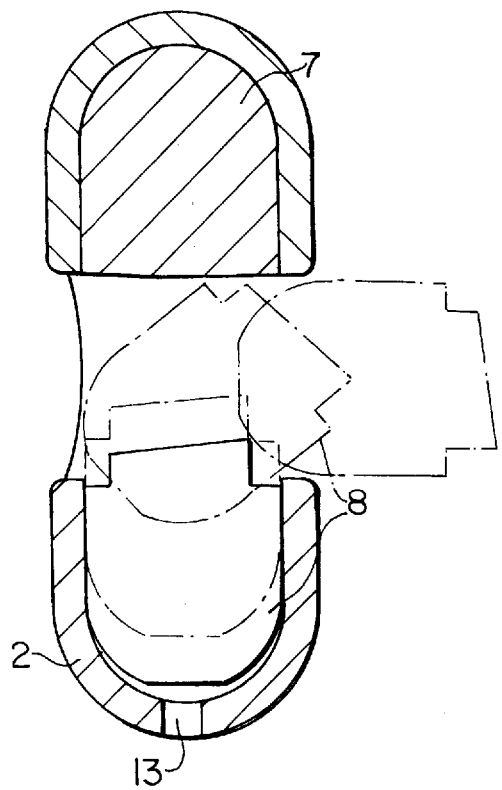
FIG. 5A is a view similar to FIG. 5 but showing the insertion of a wedge.
Figure 6:
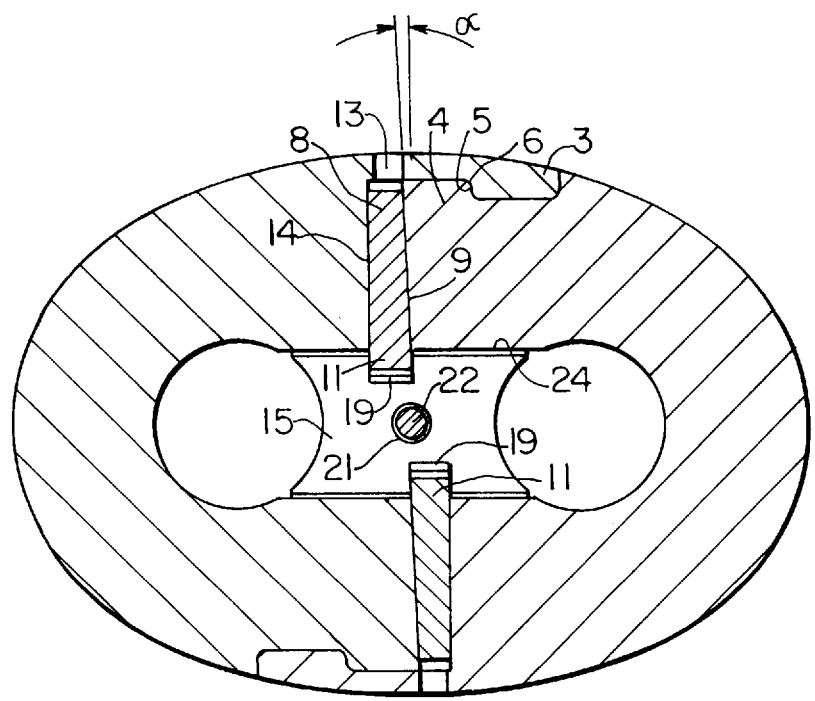
FIG. 6 shows a central sectional side view of the joining link of FIG. 1.
Figure 7:
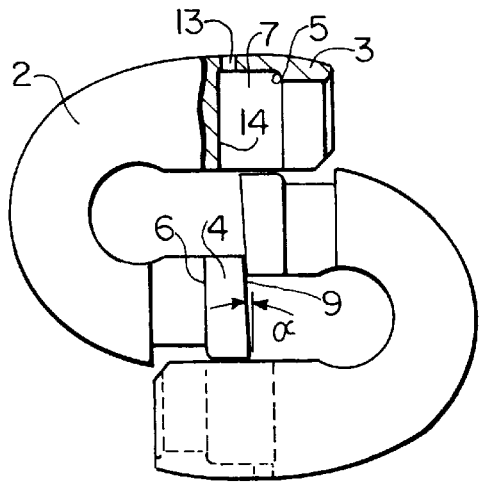
FIGS. 7 to 11 shows the sequence of steps for assembling the joining link of FIG. 1.
Figure 8:
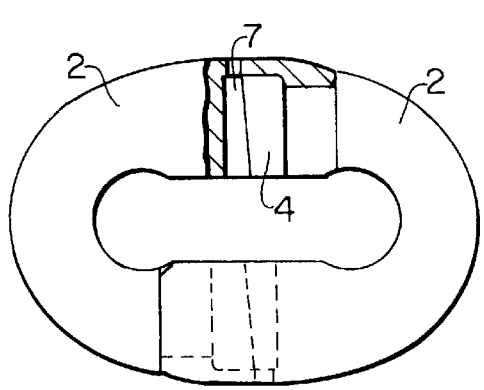
Figure 9:
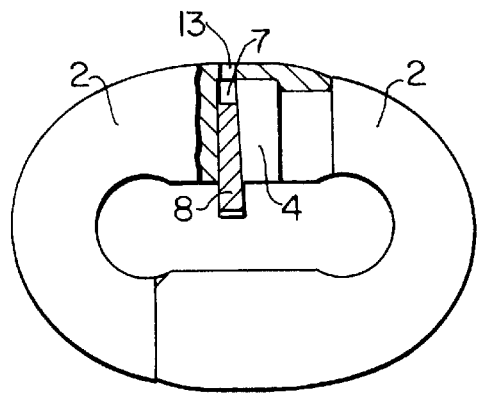
Figure 10:
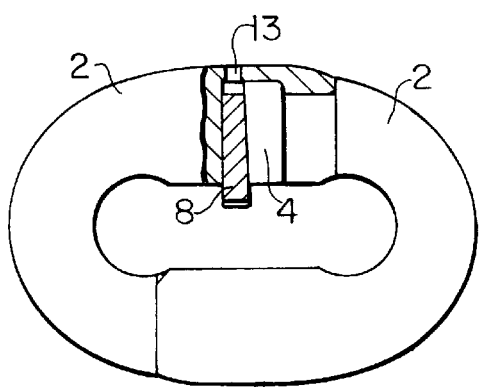

Assembly of the joining link 1, when threaded through end links (not shown) of chain sections to be joined, is accomplished by approximately aligning the U-shaped members 2 (FIG. 7) and sliding them into complete engagement (FIG. 8). Wedge 8 is now inserted by hand to recess 7 at one side of the joining link to make light contact with flange 4 and rear surface 14 of recess 7. FIG. 5A shows a method of inserting a wedge 8 into the recess 7 of a U-shaped member 2. Thus the wedge 8 is inserted normal to the body then turned through 90 to move into the position shown in FIG. 9. This is the first insertion position of wedge 8 (FIG. 9). A wedge tool 25 (FIG. 12) is provided comprising a threaded cylinder 26 with a wedge block 27 at one end and an anvil head 28 at the other end. The wedge block can bridge between surfaces 12 and 24 and matches the angle included between these surfaces. A wide disc-shaped stop-nut 29 is threaded on the cylinder 26 to act as a variable axial position stop. The wedge tool 25 is placed in the partially assembled link (FIG. 12) with the wedge block 27 in full contact both with surface 12 and with opposed surface 24. Stop-nut 29 is turned down to contact the outside surfaces of the partially assembled link. Stop-nut 29 is now turned back a particular height H above the previously contacted outside surface of the partially assembled link. The precise degree of back movement of the stop-nut 29 can be achieved using a spacer gauge (generally indicated at 32 ) which for convenience can be tethered to the anvil head 28 e.g. by a chain to form a unitary device. Thus the stop-nut 29 can be turned back until the spacer gauge 32 just fits between the nut 29 and the body of the joining link. Alternatively the gauge 32 could be seated on top of the nut 29 and a positioning nut 26A on the threaded cylinder 26 is moved down onto the gauge 32 and the nut 29 is turned back to engage the positioning nut 26A when the gauge 32 is removed to provide the required spacing H. Blows from a hammer 30 are applied to anvil head 28 to drive wedge block 27 downwards until stop-nut 29 once again contacts the outside surfaces of the partially assembled link with the result that wedge 8 is driven a particular distance H tan $\delta$ via inclined surface 12 into its desired second insertion position in recess 7. This stretches the material surrounding recess 8 in the U-shaped member 2 resulting in a tensile preload therein and a corresponding compressive preload in flange 4. The adjustable stop-nut 29 on the wedge tool 25 limits the insertion distance of wedge block 27 between surfaces 12 and 24 to H and so permits precise control of the insertion (H tan $\delta$) of wedge 8 into recess 7 and, in urn, permits precise control and predetermination of the preload established irrespective of milling tolerance errors that may be present in recess 7 or flange 4. This freedom from tolerance error influence on preload values has not hitherto been achieved in preloaded joining links for chain and permits the use of relatively coarse tolerance milling to reduce substantially the cost of the joining link. Since high compressive preloading of load transfer surfaces 5 and 6 occurs after completion of sliding engagement, galling is avoided on these highly loaded surfaces of relatively small area. Further, the lack of necessity to finalise the width of the wedges 8 following measurement of the milled widths actually achieved in flanges 3 and 4 results in all of the component parts being interchangeable between joining links of the same size.

With the first wedge 8 now located in its second insertion position, this procedure is repeated to insert the second wedge 8 into its second insertion position and so establish identical preloads in each side of the joining link.

Figure 11:
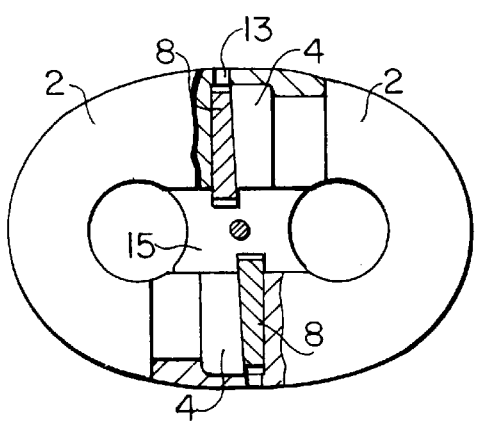

The two halves 18 of stud 15 are now slid between surfaces 17 of U-shaped members 2 so that the deformable material 20 in recesses 19 of the halves 18 engages on tangs 11 of wedges 8. Bolt 22 is placed in bore holes 21 of stud 15 and secured with nut 23. Tightening of nut 22 completes the assembly of the link (FIG. 11) and draws the halves 18 of stud 15 together to engage the deformable material 20 in recesses 19 firmly onto tangs 11 and so clamp and lock wedges 8 in their second insertion position whilst simultaneously causing inclined surfaces 16 to slide on and push hard against inclined surfaces 17 to eliminate any gap therebetween.

Any elastic stretching due to a transient axial overload on the joining link in excess of the sum of the preloads in each limb of the assembled joining link will not then result in the wedges 8 moving from their second insertion position and disrupting the balanced preloading of the joining link in subsequent normal loading conditions.

To dismantle the link and disengage from the chain section, the nut 23 is first unscrewed, bolt 22 is removed, and stud 15 halves 18 are slid out from between surfaces 17 of U-shaped members 2 to release tangs 11 of wedges 8. A drift 31 is applied (FIG. 12 with tool 25 removed) to flat land 10 on wedge 8 via hole 13 in one U-shaped member 2 and wedge 8 is driven by hammer 30 blows on the drift from its second insertion position and out of recess 7. This is repeated for the removal of the second wedge 8. To complete the disassembly procedure, U-shaped members 2 are then slid out of engagement with each other and unthreaded from the adjacent chain links of the chain sections that had been joined.

Modifications are, of course, possible in the construction of the joining link according to the present invention. For example, wedge 8 could be replaced by two or more wedges providing a wedge stack having parallel external surfaces which would vary in separation with relative movement between inclined contacting surfaces within the wedge stack. The sliding wedge of the stack would carry tang 11. Surface 9 on flange 4 would be made parallel to load transfer surface 6 and would not be subject to sliding contact with a two-wedge stack whilst face 14 of recess 8 would be free of sliding contact if a three-wedge stack is used. This would reduce machining setting operations on U-shaped member 2 to achieve further reductions in cost.

The three-wedge stack arrangement mentioned above can also be applied to the known C-shaped type of joining link an example of which is disclosed in U.S. Pat. No. 2,537,405 and wherein spaced opposed external flanges are present on the ends of a C-shaped member. In this case, a recess member of U-shape in cross-section and bearing internal flanges at each end may be placed over the external flanges of the C-shaped member (which has U-shaped end portions) and stretch-preloaded by means of a three-wedge stack, as described hereinbefore, but utilising a wedge tool adapted to react against the outside surface of the recess member. The support and locking stud would then clamp not only on the wedge tang as before but also on a corresponding fixed tang on the centre of the C-shaped member.

I claim:

1. A chain joining link comprising a link-shaped assemblage providing opposed U-shaped portions for retaining adjoining chain sections, the assemblage having a long axis and including a plurality of assemblable parts to enable the joining link to be fitted to the adjoining chain sections, at least one of the parts being provided with flange means while another of the parts is provided with recess means defining a recess substantially surrounded by material to receive the flange means during assembly of the link, with contact therebetween occurring at mating load transfer surfaces, the recess having a width measured parallel to said long axis while the flange means has a corresponding width, said width of the recess being greater than the corresponding width of said flange means and said wedge means including a wedge for insertion into the recess following insertion of the flange means to take up the difference between said widths at a first insertion position of the wedge from which forced further insertion of the wedge through a predetermined distance to a second insertion position stretches said material substantially surrounding said recess by load transfer via said load transfer surfaces without substantial relative movement occurring between the flange means and the recess means to establish a correspondingly predetermined compressive preload in the material of the flange means and a correspondingly predetermined tensile preload in the material of the recess means.

2. A chain joining link as claimed in claim 1, wherein the wedge includes a portion which protrudes from the recess when the wedge is located in the second insertion position.

3. A chain joining link, as claimed in claim 2 wherein said protruding portion of the wedge has an inclined surface arranged to cooperate with a tool to move the wedge forcibly through a said predetermined distance from the first insertion position to the second insertion position.

4. A chain joining link as claimed in claim 1 wherein release means are provided in the assemblage enabling movement of the wedge back from said second to said first position.

5. A chain joining link, as claimed in claim 4 wherein said release means comprise an access hole in the recess means whereby draft means may be applied to the wedge within the recess means to move it forcibly back from the second insertion position to the first insertion position to facilitate disassembly of the link.

6. A chain joining link, as claimed in claim 1 wherein locking means are provided to lock the wedge in the second insertion position.

7. A chain joining link, as claimed in claim 1 wherein a stud is provided constituting a columnar support for transversely bracing a central region of the link, said stud including two separate half-portions disposed one at each side of the longitudinal axis of the link.

8. A chain joining link, as claimed in claim 7, wherein said stud half-portions are fastened and drawable together by screw means.

9. A chain joining link, as claimed in claim 8, wherein each stud half-portion has inclines surfaces which operatively engage correspondingly inclined opposed inner surfaces on the engaged U-shaped portion of the link when the stud half-portions are drawn together by said screw means.

10. A chain joining link, as claimed in claim 7 wherein the stud includes recesses which accommodate the protruding portions of the wedges.

11. A chain joining link, as claimed in claim 7 where deformable material is located in the stud recesses to grip the protruding portions of the wedges and lock the wedges in the second insertion position without inhibiting operative engagement of the inclined surfaces of the stud with the corresponding inclined surface of the link.

12. A chain joining link, as claimed in claim 9, wherein a transverse surface parallel to the longitudinal axis of the link is located on each U-shaped portion between said opposed inclined inner surfaces to serve as a reaction surface for said wedge shaped tool.

13. A chain joining link, as claimed in claim 1, wherein the wedge means includes a plurality of wedges providing two variably spaced parallel surfaces which stretch the recess means by bearing on the flange means and on the recess means.

14. A chain joining link, as claimed in claim 1, wherein the U-shaped portions are similar, each portion having limbs carrying respectively said flange means and said recess means, co operating respectively with the recess means and the flange means of the other portion.

15. A chain joining link in combination with a wedge-shaped tool, said chain joining link comprising a link-shaped assemblage providing opposed U-shaped portions for retaining adjoining chain sections, the assemblage having a long axis and including a plurality of assemblable parts to enable the joining link to be fitted to the adjoining chain sections, at least one of the parts being provided with flange means while another of the parts is provided with recess means defining a recess substantially surrounded by material to receive the flange means during assembly of the link, with contact therebetween occurring at mating load transfer surfaces, the recess having a width measured parallel to said long axis while the flange means has a corresponding width, said width of the recess being greater than the corresponding width of said flange means and said wedge means including a wedge for insertion into the recess following insertion of the flange means to take up the difference between said widths at a first insertion position of the wedge from which forced further insertion of the wedge through a predetermined distance to a second insertion position stretches said material substantially surrounding said recess by load transfer via said load transfer surfaces without substantial relative movement occurring between the flange means and the recess means to establish a correspondingly predetermined compressive preload in the material of the flange means and a correspondingly predetermined tensile preload in the material of the recess means, wherein the wedge includes a portion which protrudes from the recess when the wedge is located in the second insertion position, said protruding portion of the wedge having an inclined surface arranged to cooperate with a tool to move the wedge forcibly through a said predetermined distance from the first insertion position to the second insertion position; and said wedge shaped tool being provided with stops to control operative movement of the tool, wherein the wedge shaped tool is slidable transversely through the link between said stops to move the wedge forcibly through said predetermined distance from the first insertion position to said second insertion position.

\* \* \* \* \*